US009902295B2

(12) United States Patent
Napau et al.

(10) Patent No.: US 9,902,295 B2
(45) Date of Patent: Feb. 27, 2018

(54) SINGLE-STAGE GEAR REDUCTION OUTPUT MECHANISM WITH A LOCKING FORK PROVIDING ANTI-BACK DRIVE CAPABILITY FOR AUTOMOTIVE SEAT ADJUSTER DRIVES

(71) Applicant: FISHER & COMPANY, INCORPORATED, St. Clair Shores, MI (US)

(72) Inventors: Mircea Napau, Sterling Heights, MI (US); Doina Napau, Sterling Heights, MI (US); Ileana-Dacia Napau, Cugir (RO); Dean Lenane, Grosse Pointe Woods, MI (US); Matthew Essian, Clinton Township, MI (US); Ioan Napau, Rochester Hills, MI (US)

(73) Assignee: FISHER & COMPANY, INCORPORATED, St. Clair Shores, MI (US)

(*) Notice: Subject to any disclaimer, the term of this patent is extended or adjusted under 35 U.S.C. 154(b) by 0 days.

(21) Appl. No.: 15/245,719

(22) Filed: Aug. 24, 2016

(65) Prior Publication Data
US 2017/0059017 A1 Mar. 2, 2017

Related U.S. Application Data

(60) Provisional application No. 62/209,602, filed on Aug. 25, 2015.

(51) Int. Cl.
*B60N 2/02* (2006.01)
*B60N 2/18* (2006.01)

(52) U.S. Cl.
CPC ......... *B60N 2/1871* (2013.01); *B60N 2/0232* (2013.01); *B60N 2/181* (2013.01);
(Continued)

(58) Field of Classification Search
CPC .................................................. B60N 2/0232
See application file for complete search history.

(56) References Cited

U.S. PATENT DOCUMENTS

| 546,249 A | 9/1895 | Regan |
| 978,371 A | 12/1910 | Harrison |

(Continued)

FOREIGN PATENT DOCUMENTS

| DE | 102009006815 A1 | 8/2009 |
| EP | 0450324 A2 | 10/1991 |

(Continued)

OTHER PUBLICATIONS

International Search Report and Written Opinion dated Nov. 28, 2016, regarding International Application No. PCT/US2016/048649.

(Continued)

*Primary Examiner* — Derek D Knight
(74) *Attorney, Agent, or Firm* — Harness, Dickey & Pierce, P.L.C.

(57) ABSTRACT

A single-stage gear reduction output mechanism for an automotive seat assembly including a gear housing bracket, gear housing, axle shaft, eccentric, and first and second gears. The axle shaft extends through the eccentric with a slip fit, the first gear rotates with the axle shaft, and the second gear is carried on a first bearing surface of the eccentric and meshingly engages the first gear in a planetary arrangement. A locking plate including first, second, and third slot cutouts is disposed within the gear housing. A support pin extends from the gear housing through the first slot cutout and a second bearing surface of the eccentric extends through the second slot cutout to support the locking plate and limit its movement along a lateral axis. The second gear includes a first pin that extends through the third slot (Continued)

cutout to prevent the first gear from back-driving the second gear.

20 Claims, 5 Drawing Sheets

(52) U.S. Cl.
 CPC ......... B60N 2/1835 (2013.01); B60N 2/1864 (2013.01); B60N 2/1867 (2013.01); *B60N 2002/024* (2013.01); *B60N 2002/0236* (2013.01)

(56) References Cited

U.S. PATENT DOCUMENTS

| | | | |
|---|---|---|---|
| 1,192,627 A | | 7/1916 | Hatlee |
| 1,694,031 A | | 12/1928 | Braren |
| 1,770,035 A | | 7/1930 | Heap et al. |
| 2,168,164 A | | 8/1939 | Kittredge |
| 2,170,951 A | | 8/1939 | Perry |
| 2,250,259 A | | 7/1941 | Foote, Jr. |
| 2,475,504 A | | 7/1949 | Jackson |
| 2,508,121 A | | 5/1950 | McIver |
| 2,609,713 A | | 9/1952 | Martin |
| 2,972,910 A | | 2/1961 | Menge, Sr. |
| 2,995,226 A | | 8/1961 | Gilder |
| 3,013,447 A | | 12/1961 | Hils et al. |
| 3,037,400 A | | 6/1962 | Sundt |
| 3,144,791 A | | 8/1964 | Menge, Sr. |
| 3,427,901 A | | 2/1969 | Wildhaber |
| 3,451,290 A | | 6/1969 | Wildhaber |
| 3,965,773 A | * | 6/1976 | Bert .......................... F16H 1/32 475/162 |
| 4,023,441 A | | 5/1977 | Osterwalder |
| 4,228,698 A | | 10/1980 | Winiasz |
| 4,452,102 A | | 6/1984 | Shaffer |
| 4,967,615 A | | 11/1990 | Mills |
| 5,030,184 A | | 7/1991 | Rennerfelt |
| 5,425,683 A | | 6/1995 | Bang |
| 5,505,668 A | | 4/1996 | Koriakov-Savoysky et al. |
| 6,261,199 B1 | | 7/2001 | Schlangen |
| 7,322,257 B2 | | 1/2008 | Becker et al. |
| 2005/0146174 A1 | | 7/2005 | Maddelein et al. |
| 2007/0029893 A1 | | 2/2007 | Schuler et al. |
| 2007/0209857 A1 | | 9/2007 | Wolf |
| 2008/0261743 A1 | | 10/2008 | Junkers |
| 2009/0045661 A1 | | 2/2009 | Stoessel et al. |
| 2010/0139425 A1 | | 6/2010 | Schulz et al. |
| 2010/0237216 A1 | | 9/2010 | Napau et al. |
| 2013/0180348 A1 | | 7/2013 | Andres et al. |
| 2013/0333496 A1 | | 12/2013 | Boutouil et al. |
| 2014/0238188 A1 | * | 8/2014 | Ito .......................... B60N 2/0228 74/664 |
| 2015/0283924 A1 | * | 10/2015 | Boutouil .............. B60N 2/2251 297/362 |
| 2016/0257223 A1 | * | 9/2016 | Markel ................ B60N 2/0232 |

FOREIGN PATENT DOCUMENTS

| | | |
|---|---|---|
| FR | 679410 A | 4/1930 |
| WO | WO 2010/116125 A1 | 10/2010 |
| WO | WO-2011137989 A1 | 11/2011 |
| WO | WO-2012/150050 A1 | 11/2012 |
| WO | WO-2013/010888 A2 | 1/2013 |

OTHER PUBLICATIONS

International Search Report for PCT/US2016/048634; dated Dec. 21, 2016; 3 pp.

\* cited by examiner

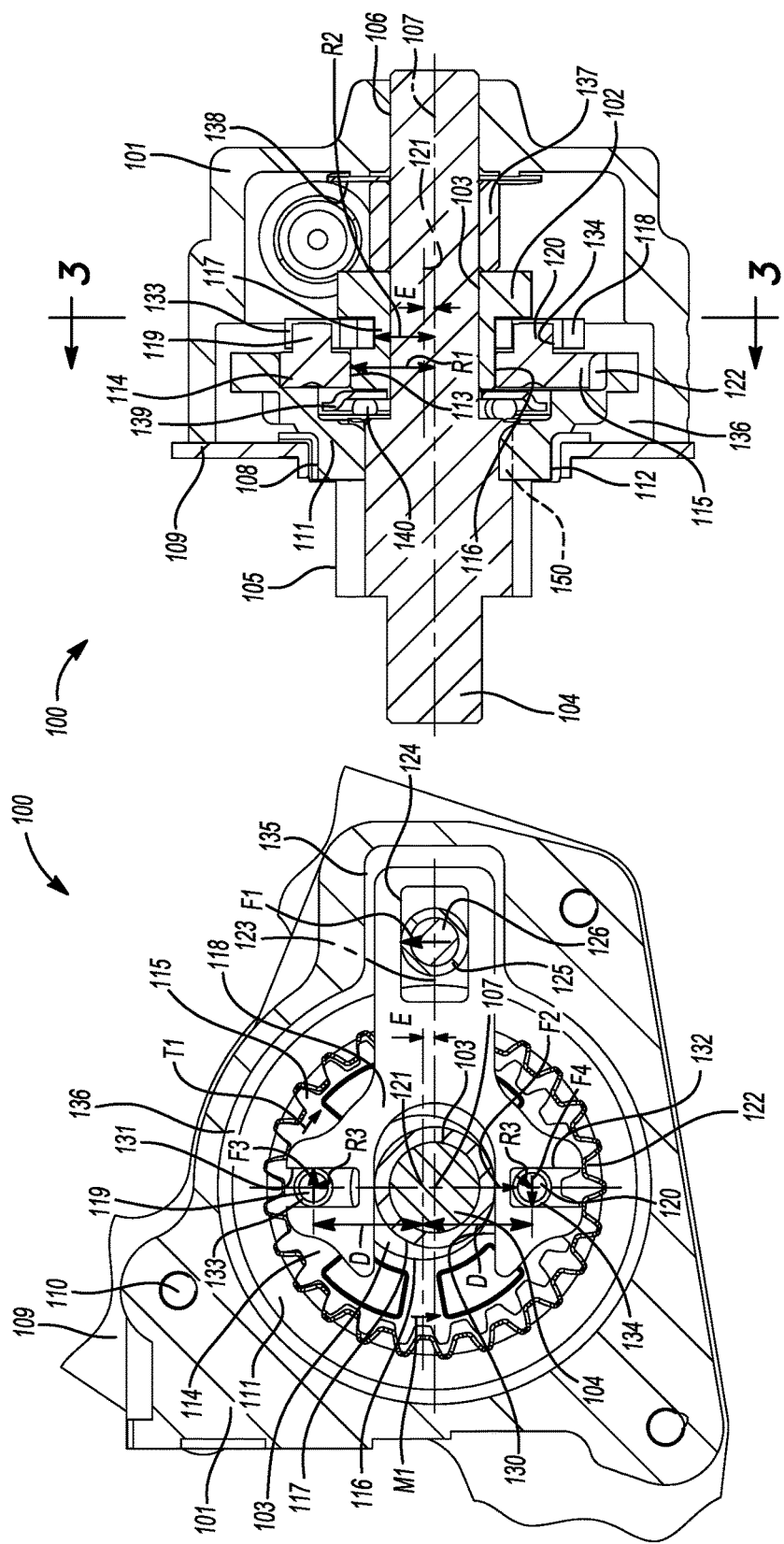

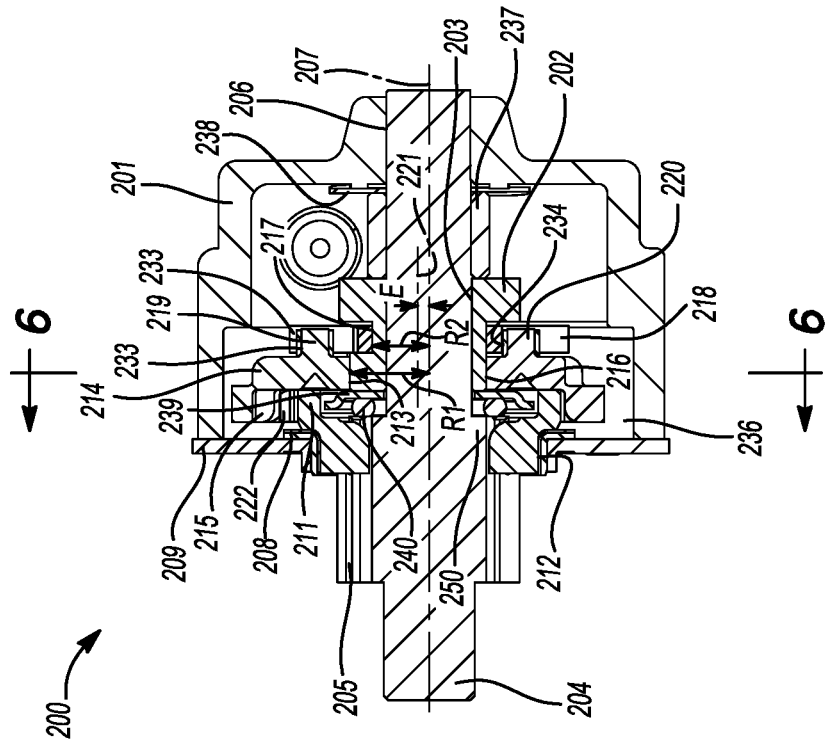
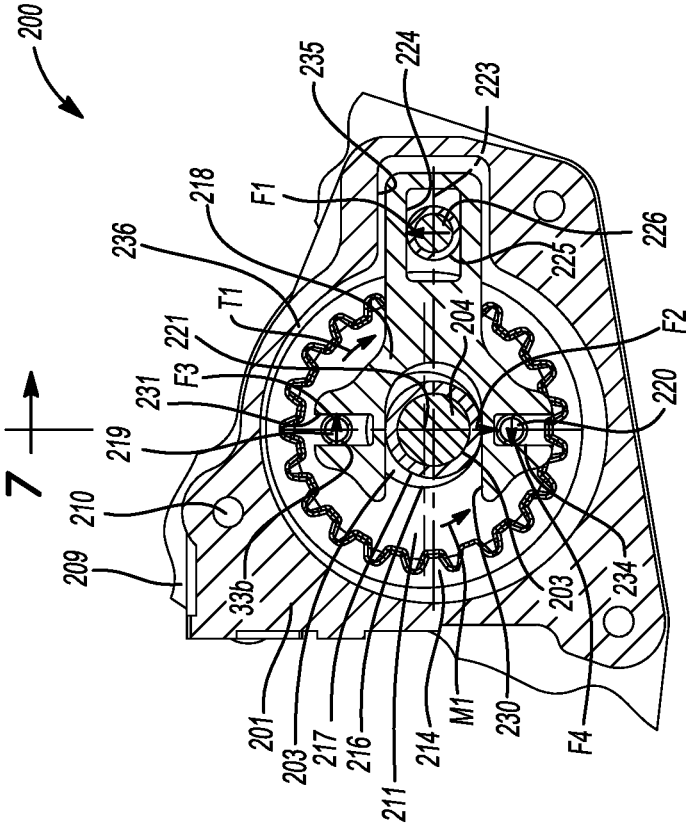

SINGLE-STAGE GEAR REDUCTION OUTPUT MECHANISM WITH A LOCKING FORK PROVIDING ANTI-BACK DRIVE CAPABILITY FOR AUTOMOTIVE SEAT ADJUSTER DRIVES

CROSS-REFERENCE TO RELATED APPLICATIONS

This application claims the benefit of U.S. Provisional Application No. 62/209,602, filed on Aug. 25, 2015. The entire disclosure of the above application is incorporated herein by reference.

FIELD

The present disclosure generally relates to automotive seat adjuster drives. More specifically, a single-stage gear reduction output mechanism for an automotive seat adjuster drive is disclosed.

BACKGROUND

This section provides background information related to the present disclosure which is not necessarily prior art.

There are an increasing number of electrical actuators in today's vehicles. By way of example and without limitation, electrical actuators may be utilized to power windows, rear-view mirrors, seats, windshield wipers, antennas, spoilers, convertible rooves, hoods, oil pumps, and water pumps. Electrical actuators are driven by electric motors, the size of which is selected according to the torque it must provide to produce the required motion. Thus, if a reasonably high reduction gear ratio can be achieve in a very limited space, smaller and faster electric motors can be used to provide the same level of mechanical power needed for the required motion.

Generally speaking, gear drives used in automotive interior actuators can perform several useful functions: reduce or increase the speed, multiply or decrease the torque, and reverse the direction of rotation. In one example, automotive seat adjuster drives are gear drives that provide seat height adjustment and/or seat tilt position adjustment in automotive vehicles. Automotive seat adjuster drives serve to reduce the electric motor input speed while increasing the input torque. Some of the most important requirements for automotive seat adjuster drives include: the range of reduction ratio, the range of output torque, size, weight, efficiency, the level of noise produced by the automotive seat adjuster drive, shock load capability, cost, durability, and the amount of backlash. For some applications, such as those used in adjusting and maintaining the adjusted position of a vehicle seat, a special requirement called anti-back drive capability is also required. Anti-back drive capability may also be referred to as "non-back drive capability," "self-locking capability," or "anti-regression capability." Gear drives transfer the high speed and low torque rotation of an electric motor input shaft to low speed and high torque rotation of an output shaft, in either, a clockwise (CW) or a counter-clockwise (CCW) direction of rotation. For gear drives with anti-back drive capability, any attempt to transfer torque from the output shaft back to the input shaft by applying an external load (e.g. occupant weight or external reaction forces in the case of a crash accident, etc.) to the output shaft is prevented. This protects against damage to the electric motor and ensures that the vehicle seat maintains its position when the electric motor is not energized.

Gear drives with anti-back drive capabilities have been developed that multiply the torque and reduce the speed in either a clockwise or a counter-clockwise direction of rotation. Worm and worm-wheel gear drives have been used successfully for many years as a safety or self-locking device. Worm and worm-wheel gear drives avoid the need for an external brake or clutch mechanism. However, the disadvantages of worm and worm-wheel gear drives are that the anti-back drive capability is achieved only if the reduction ratio is on the order of 25:1 or larger, leading to a relatively low mechanical efficiency. Theoretically, the maximum efficiency of worm and worm-wheel gear drives with anti-back drive capability is 50 percent. Moreover, worm and worm-wheel gear drives may not provide anti-back drive capability in all operating conditions, such as in the presence of unwanted dynamic vibrations.

In addition to anti-back drive capability and an increased operating efficiency, gear reduction mechanisms used in vehicle seat height and tilt adjusters must have: a relatively high gear ratio, (typically in the range of 300:1 to 700:1), reduced packaging, reduced noise during operation, and low manufacturing and assembly costs. A practical solution for a coaxial or an orthogonal gear transmission that is able to meet all the above mentioned requirements using only a single-stage reduction mechanism is not possible. Thus, several gear drives are being pursued that utilize two-stages of gear reduction, in which the second-stage of gear reduction provides the necessary output torque and speed while preserving anti-back drive capability. Usually, such two-stage transmissions exploit the properties of single-stage planetary gear drives, which use an eccentric to drive a planetary gear for providing high gear ratios in a very compact space, and different coupling or compensating arrangements to prevent rotation of the planetary gear about its own axis of rotation to provide anti-back drive capability. Such coupling or compensating arrangements are based on a reciprocating sliding, rolling, or wedging action between the planetary gears and the housing or another component that is fixed to the housing.

The following patents and patent application publications EP0450324, U.S. Pat. No. 4,228,698, WO2012/150050, US2013/0180348 and US2007/0209857 disclose planetary gear reduction mechanisms where the coupling or compensating arrangements use reciprocating, sliding movements between adjacent elements during torque transmitting operations. Several other patents, including U.S. Pat. No. 5,425,683, U.S. Pat. No. 6,261,199, U.S. Pat. No. 3,013,447, U.S. Pat. No. 2,609,713, FR679410, U.S. Pat. No. 2,508,121, U.S. Pat. No. 2,995,226 and U.S. Pat. No. 4,967,615 disclose planetary gear reduction mechanisms where the coupling or compensating arrangements use rolling contact action between adjacent elements during torque transmitting operations. Although all of the aforementioned patents and patent application publications solve the main requirement related to anti-back drive capability, these solutions exhibit low overall mechanical efficiency, require a large packaging space, utilize heavy and complicated architectures, produce excessive noise, and/or are expensive to manufacture and assembled.

SUMMARY

This section provides a general summary of the disclosure and is not a comprehensive disclosure of its full scope or all of its features.

The subject disclosure provides for single-stage gear reduction output mechanisms for automotive seat adjuster drives. The single-stage gear reduction output mechanisms generally include a gear housing bracket, a gear housing, an axle shaft, an eccentric, and first and second gears. The gear housing extends from the gear housing bracket to define a cavity. The axle shaft is disposed within the cavity and extends along an axis of rotation. The axle shaft is supported within the cavity of the gear housing such that the axle shaft is free to rotate about the axis of rotation. The eccentric is carried on the axle shaft. The eccentric includes first and second bearing surfaces and a first bore. The first bore of the eccentric is concentric with the axle shaft, the first bearing surface of the eccentric is eccentric relative to the axle shaft, and the second bearing surface of the eccentric is concentric with the axle shaft. The axle shaft extends through the first bore in the eccentric with a slip fit such that the eccentric is free to rotate relative to the axle shaft.

The first gear is carried on the axle shaft and is rotatably coupled to the axle shaft such that the first gear rotates with the axle shaft about the axis of rotation. The second gear is carried on the first bearing surface of the eccentric and is disposed in meshing engagement with the first gear. The second gear includes a second bore and a centerline axis that extends co-axially through the second bore. The first bearing surface of the eccentric extends through the second bore in the second gear with a slip fit such that the eccentric is free to rotate relative to the second gear. The first gear and the second gear having a planetary arrangement where the centerline axis of the second gear is parallel to and spaced from the axis of rotation of the axle shaft.

The single-stage gear reduction output mechanisms generally include a locking plate and a support pin. The locking plate is disposed within the cavity of the gear housing and includes a first slot cutout, a second slot cutout, and a third slot cutout. The support pin is rigidly fixed in place relative to the axle shaft at an orientation that is parallel to the axis of rotation of the axle shaft and at a location that is spaced from the axis of rotation of the axle shaft. The support pin extends through the first slot cutout in the locking plate and the second bearing surface of the eccentric extends through the second slot cutout in the locking plate. As a result, the second bearing surface of the eccentric and the support pin cooperate to support the locking plate within the cavity of the gear housing and limit the movement of the locking plate relative to the gear housing to movement along a lateral axis. This lateral axis is transverse to the axis of rotation of the axle shaft. The second gear further includes a first pin that is spaced from and is parallel to the centerline axis of the second gear. The first pin extends through the third slot cutout in the locking plate and prevents the first gear from driving rotation of the second gear.

Advantageously, the single-stage gear reduction output mechanisms of the present disclosure provide several technical solutions in the field of single-stage gear reduction output mechanisms, used for vehicle seat height and/or tilt position adjustment. The present disclosure provides for single-stage gear reduction output mechanisms with anti-back drive capability and improved overall mechanical efficiency. The pin arrangement of the single-stage gear reduction output mechanisms disclosed herein improves efficiency by reducing friction losses and guarantees anti-back drive capability in all operating conditions. The estimated range of overall efficiency improvement is between seven and fifteen percent compared to conventional anti-back drive transmissions. In addition to efficiency improvements, the single-stage gear reduction output mechanisms of the present disclosure are very compact, have reasonable weight, good durability, quiet operation, are easy to assemble, and have competitive manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a front cross-sectional view of the exemplary single-stage gear reduction output mechanism shown in FIG. 1 taken along line 3-3 in FIG. 4;

FIG. 4 is a side cross-sectional view of the exemplary single-stage gear reduction output mechanism shown in FIG. 1 taken along line 4-4 in FIG. 3;

FIG. 6 is a front cross-sectional view of the exemplary single-stage gear reduction output mechanism shown in FIG. 4 taken along line 6-6 in FIG. 7; and FIG. 7 is a side cross-sectional view of the exemplary single-stage gear reduction output mechanism shown in FIG. 4 taken along the line 7-7 in FIG. 6.

DETAILED DESCRIPTION

Figure 1:
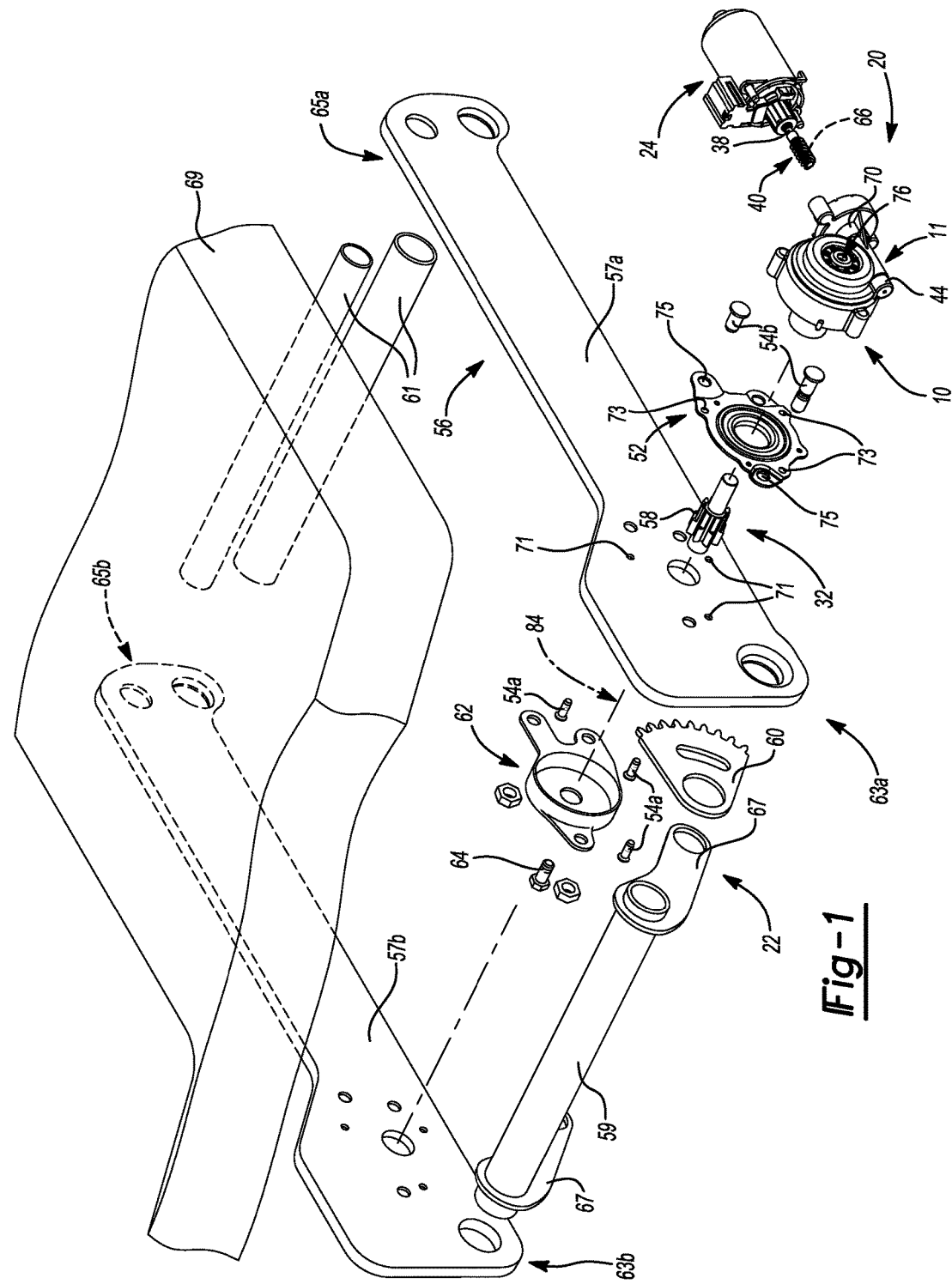
FIG. 1 is a perspective exploded view of an exemplary automotive seat assembly including an actuator and an exemplary single-stage gear reduction output mechanism constructed in accordance with the present disclosure.

Referring to the Figures, wherein like numerals indicate corresponding parts throughout the several views, several single-stage gear reduction output mechanisms 10, 100, 200 for an automotive seat adjuster drive 20 are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the automotive seat adjuster drive 20 is shown in combination with an automotive seat assembly 22. The automotive seat adjuster drive 20 includes an actuator 24 that drives a single-stage gear reduction output mechanism 10. The actuator 24 includes a rotatable shaft 38 and a worm 40 that rotates with the rotatable shaft 38. The actuator 24 is mounted to a gear housing 11. The rotatable shaft 38 of the actuator 24 is received within a worm receptacle 44 of the gear housing 11. The gear housing 11 is connected to a gear housing bracket 52 with a plurality of fasteners 54a. The gear housing bracket 52 attaches to a frame 56 of the automotive seat assembly 22 with fasteners 54b. The frame 56 includes two side plates 57a, 57b that are spaced apart from one another. The gear housing bracket 52 supports the single-stage gear reduction output mechanism 10 and holds the single-stage gear reduction output mechanism 10 on one of the side plates 57a of the frame 56 of the automotive seat assembly 22.

The frame 56 further includes a rear cross-member 59 and one or more front cross-members 61. The two side plates 57a, 57b extend between a pair of rearward ends 63a, 63b and a pair of forward ends 65a, 65b. The rear cross-member 59 extends across the frame 56 between the pair of rearward ends 63a, 63b of the two side plates 57a, 57b and the front cross-members 61 extend across the frame 56 between the pair of forward ends 65a, 65b of the two side plates 57a, 57b. The pair of forward ends 65a, 65b of the two side plates 57a, 57b are designed to be pivotally connected to a vehicle floor (not shown). The rear cross-member 59 of the frame 56 is pivotally connected to the pair of rearward ends 63a, 63b of the frame 56 and includes one or more links 67 that are rotatably fixed with the rear cross-member 59. The links 67 are designed to be pivotally connected to the vehicle floor. The single-stage gear reduction output mechanism 10 includes a pinion member 32 with a splined portion 58 that meshes with a sector gear 60 of the automotive seat assembly 20. The sector gear 60 is rotatably fixed with the rear cross-member 59. Therefore, it should be appreciated that rotation of the pinion member 32 causes the sector gear 60 to pivot either up or down, which raises and lowers the frame 56 of the automotive seat assembly 22 relative to the vehicle floor. The automotive seat assembly 22 includes a vehicle seat 69 that is mounted to the frame 56 and that moves with the frame 56 in response to rotation of the pinion member 32.

The automotive seat assembly 22 also includes a crash bracket 62. The crash bracket 62 is mounted to one of the side plates 57a of the frame 56 of the automotive seat assembly 22. A bolt 64 extends through the crash bracket 62 and into the pinion member 32. The bolt 64 supports the pinion member 32 while still permitting the pinion member 32 to rotate relative to the crash bracket 62 and the frame 56 of the automotive seat assembly 20. Fasteners 54a extend through holes 71 in one of the side plates 57a of the frame 56, holes 73 in the gear housing bracket 52, and into the gear housing 11. Fasteners 54b extend through holes 75 in the gear housing bracket 52 and through holes in one of the side plates 57a of the frame 56 and the crash bracket 62.

The actuator 24 in the illustrated example is an electric motor; however, it should be appreciated that the actuator 24 may take a variety of different forms without departing from the scope of the subject disclosure. By way of example and without limitation, the actuator 24 could be pneumatic, a manually operated knob, or a manually operated lever. In operation, the actuator 24 drives rotation of the rotatable shaft 38, which in turn drives rotation of the worm 40. The rotatable shaft 38 may be made of a variety of different materials, including without limitation, a metallic material. The rotatable shaft 38 generally extends away from the actuator 24 to a distal end 66. The worm 40 is rotatably fixed with the rotatable shaft 38 of the actuator 24 meaning that the worm 40 rotates with the rotatable shaft 38. While the worm 40 may be positioned on the rotatable shaft 38 at a variety of different locations, by way of example and without limitation, the worm 40 may be positioned at or near the distal end 66 of the rotatable shaft 38. The worm 40 may be integral with the rotatable shaft 38 of the actuator 24, or alternatively, the worm 40 may be a separate component that is mounted on or otherwise coupled to the rotatable shaft 38. The worm 40 has one or more screw-like teeth that wrap around the rotatable shaft 38 in a spiraling fashion.

Figure 2:
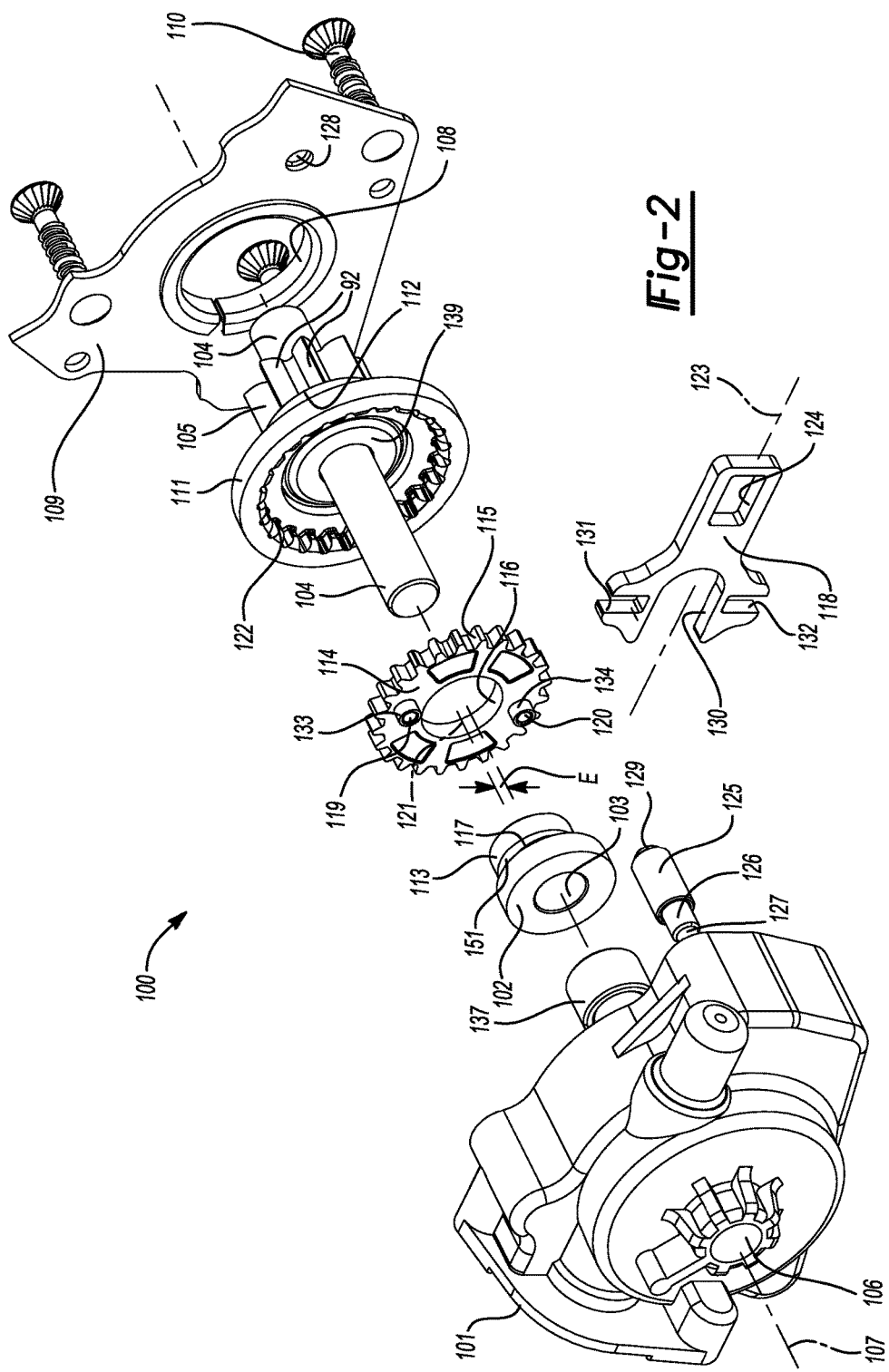
FIG. 2 is a front perspective exploded view of an exemplary single-stage gear reduction output mechanism constructed in accordance with the present disclosure that includes a locking plate retained by first and second pins projecting from a planetary gear with external teeth and a support pin extending from a gear housing of the single-stage gear reduction output mechanism.

With reference to FIGS. 2-4, a single-stage gear reduction output mechanism 100 with anti-back drive capability and improved mechanical efficiency is illustrated. The single-stage gear reduction output mechanism 100 shown in FIGS. 2-4 can be used in place of the single-stage gear reduction output mechanism 10 shown in FIG. 1. The single-stage gear reduction output mechanism 100 includes a gear housing 101. By way of example and without limitation, the gear housing 101 may be made from a rigid material such as plastic. The single-stage gear reduction output mechanism 100 further includes an eccentric 102. The eccentric 102 is rotatably driven by the actuator 24 shown in FIG. 1. Although various arrangements are possible, the eccentric 102 may include gear teeth (not shown) that mesh with the worm 40 shown in FIG. 1 to translate rotational movement of the rotatable shaft 38 of the actuator 24 shown in FIG. 1 to rotational movement of the eccentric 102. Alternatively, the eccentric 102 may be rotatably coupled to one or more input gears (not shown) that are driven by the actuator 24 shown in FIG. 1. By way of example and without limitation, the eccentric 102 may be made from plastic, metal or powdered metal. The eccentric 102 includes a first bore 103. The first bore 103 of the eccentric 102 may be cylindrical in shape and may optionally include a metal insert (not shown) for increased wear resistance.

The eccentric 102 is rotatably supported on an axle shaft 104 that extends through the first bore 103 of the eccentric 102. There is a slip fit between the axle shaft 104 and the first bore 103 of the eccentric 102 such that the eccentric 102 can freely rotate on the axle shaft 104. The axle shaft 104 has an output pinion 105. The output pinion 105 may include integrally formed or rigidly connected pinion teeth 92 configured to engage the teeth of the sector gear 60 illustrated in FIG. 1. The axle shaft 104 extends co-axially along an axis of rotation 107 and may be made from a metal such as steel. The first bore 103 of the eccentric 102 is co-axially aligned with the axis of rotation 107 of the axle shaft 104 (i.e., is concentric with the axle shaft 104). The axle shaft 104 is rotatably supported by a central bearing surface 106 disposed within the gear housing 101. The single-stage gear reduction output mechanism 100 further includes a gear housing bracket 109. By way of example and without limitation, the gear housing bracket 109 may be made of stamped steel. The gear housing bracket 109 includes a bearing sleeve 108 that is aligned co-axially with the axis of rotation 107 of the axle shaft 104. The bearing sleeve 108 of the gear housing bracket 109 may be cylindrical in shape and may optionally be made from an anti-friction material such as a self-lubricated plastic material. The gear housing 101 may be rigidly fastened to the gear housing bracket 109 by fasteners 110.

The single-stage gear reduction output mechanism 100 includes a first gear 111. In FIGS. 2-4, the first gear 111 is rotatably coupled to the axle shaft 104. Although the first gear 111 may be rotatably coupled to the axle shaft 104 in a number of different ways, in the illustrated example, the first gear 111 is rotatably coupled to the output pinion 105 and thus the axle shaft 104 by splines 150. In FIGS. 2-4, the first gear 111 includes internal teeth 122 and has an external bearing surface 112. The external bearing surface 112 of the first gear 111 may be cylindrical in shape and extends through and contacts the bearing sleeve 108 of the gear housing bracket 109 such that the axle shaft 104 is rotatably supported at the gear housing bracket 109.

The eccentric 102 has a first bearing surface 113. As shown in FIGS. 2-4, the first bearing surface 113 of the eccentric 102 is cylindrical in shape and has a first radius R1. The first bearing surface 113 of the eccentric 102 relative to the axle shaft 104 and has a eccentricity E. The single-stage gear reduction output mechanism 100 also includes a second gear 114. The first and second gears 111, 114 of the single-stage gear reduction output mechanism 100 are meshingly engaged in a planetary arrangement where one of the first and second gears 111, 114 travels in a planetary, wobbling motion within or about the other one of the first and second gears 111, 114. In FIGS. 2-4, the second gear 114 includes external teeth 115 that mesh with the internal teeth 122 of the first gear 111. Although different configuration are possible, the internal and external teeth 115, 122 of the first and second gears 111, 114 may have a cycloid profile. The first and second gears 111, 114 may be made of a variety of different materials. By way of example and without limitation, the first and second gears 111, 114 may be stamped metal. The second gear 114 is rotatably supported on the first bearing surface 113 of the eccentric 102. The second gear 114 has a second bore 116. The first bearing surface 113 of the eccentric 102 extends through and contacts the second bore 116 of the second gear 114. There is a slip fit between the first bearing surface 113 of the eccentric 102 and the second bore 116 of the second gear 114 such that the second gear 114 can freely rotate on the first bearing surface 113 of the eccentric 102.

The eccentric 102 has also a second bearing surface 117. As illustrated in FIGS. 2-4, the second bearing surface 117 is cylindrical in shape, is co-axially arranged with the axis of rotation 107 of the axle shaft 104 (i.e., is concentric with the axle shaft 104), and has a second radius R2. The second radius R2 of the second bearing surface 117 is smaller than the first radius R1 of the first bearing surface 113. Due to the size difference between R1 and R2 and the eccentric (i.e. off-set) arrangement of the first bearing surface 113, a slot 151 is formed in the eccentric 102 adjacent the second bearing surface 117 on which a locking plate 118 is sliding supported and guided. The second bearing surface 117 and thus slot 151 in the eccentric 102 are not aligned with (i.e. are longitudinally offset relative to) the internal and external teeth 115, 122 of the first and second gears 111, 114. Accordingly, the locking plate 118 is longitudinally offset relative to the internal and external teeth 115, 122 of the first and second gears 111, 114 and does not contact or otherwise engage the internal or external teeth 115, 122 of the first and second gears 111, 114. Optionally, the eccentric 102 may have metal inserts (not shown) at the first and second bearing surfaces 113 and 117 to minimize wear.

The second gear 114 has first and second pins 119, 120 that extend longitudinally (i.e. parallel to the axis of rotation 107 of the axle shaft 104) from the second gear 114. The first and second pins 119, 120 shown in FIGS. 2-4 are cylindrical in shape, have a third radius R3, and are rigidly connected to one of the side faces of the second gear 114. The second gear 114 has a centerline axis 121 that extends longitudinally through the second bore 116. The centerline axis 121 is parallel to the axis of rotation 107 of the axle shaft 104 and is spaced from the axis of rotation 107 by eccentricity E. The first and second pins 119, 120 are positioned symmetrically about the centerline axis 121 of the second gear 114 such that each of the first and second pins 119, 120 are positioned at a distance D from the centerline axis 121, of the second gear 114. The locking plate 118 engages the first and second pins 119, 120 of the second gear 114 and therefore guides the movement of the second gear 114. While not shown, it should be appreciated that the second pin 120 may optionally be eliminated from the second gear 114 without a significant change to the operation of the single-stage gear reduction output mechanism 100.

As shown in FIGS. 2-4, the locking plate 118 has a fork-like shape and can be made from a variety of different materials. By way of example and without limitation, the locking plate 118 may be made of stamped steel. The locking plate 118 extends along a lateral axis 123 that is transverse to the axis of rotation 107 of the axle shaft 104. The locking plate 118 has first and second slot cutouts 124, 130 that extend along the lateral axis 123 and third and fourth slot cutouts 131, 132 that are disposed on opposite sides of the lateral axis 123 of the locking plate 118. The first slot cutout 124 is rectangular in shape and is closed on all four sides. The second slot cutout 130 has a U-like shape, is open on one side, and is spaced along the lateral axis 123 from the first slot cutout 124. The third and fourth slot cutouts 131, 132 have U-like shapes, are open on one side, are spaced from the lateral axis 123, and extend in a direction that is transverse to the lateral axis 123 of the locking plate 118. Although various configurations of the locking plate 118 are possible, the locking plate 118 shown in FIGS. 2-4 is symmetrical about the lateral axis 123. The specific shape of the locking plate 118 provides sufficient integrity and strength for absorbing shock at a minimum weight.

The single-stage gear reduction output mechanism 100 further includes a support pin 126 that is fixed relative to the gear housing 101. The support pin 126 is spaced from and extends parallel to the axis of rotation 107 of the axle shaft 104 between a first support pin end 127 and a second support pin end 129. The support pin 126 is rigidly fixed to the gear housing 101 at the first support pin end 127 and is rigidly fixed to a hole 128 in the gear housing bracket 109 at the second support pin end 129. The locking plate 118 is supported on and guided by the first and second pins 119, 120 on the second gear 114, the support pin 126, and the second bearing surface 117 of the eccentric 102. The support pin 126 is received in and extends through the first slot cutout 124 in the locking plate 118. The second slot cutout 130 in the locking plate 118 bears against the second bearing surface 117 of the eccentric 102. Because the second bearing surface 117 of the eccentric 102 is co-axially aligned with the axis of rotation 107 of the axle shaft 104, the interfaces between the support pin 126 and the first slot cutout 124 and the second bearing surface 117 of the eccentric 102 and the second slot cutout 130 restrict the locking plate 118 to a limited range of movement along the lateral axis 123. The first and second pins 119, 120 on the second gear 114 are received in and extend through the third and fourth slot cutouts 131, 132 in the locking plate 118, respectively. The interfaces between the first and second pins 119, 120 on the second gear 114 and the third and fourth slot cutouts 131, 132 in the locking plate 118 restrict the movement of the second gear 114 to a planetary, wobbling motion and prevent the second gear 114 from rotating 360 degrees about its centerline axis 121. As will be explained below, the interaction between the locking plate 118 and the first and second pins 119, 120 on the second gear 114, the support pin 126, and the second bearing surface 117 of the eccentric 102 also prevent the axle shaft 104 from rotating in either direction (i.e. clockwise or counter-clockwise) when the eccentric 102 is not being driven by the actuator 24 and therefore provides anti-back drive capability.

Optionally, a first roller sleeve 125 may be fitted over the support pin 126. Similarly, second and third roller sleeves 133, 134 may optionally be fitted over the first and second pins 119, 120 on the second gear 114. The first, second, and third roller sleeves 125, 133, 134 may be sized to provide a slip fit between the support pin 126 and the first roller sleeve 125 and between the first and second pins 119, 120 on the second gear 114 and the second and third roller sleeves 133, 134 such that the first, second, and third roller sleeves 125, 133, 134 maybe free to rotate on the support pin 126 and the first and second pins 119, 120 on the second gear 114. This arrangement therefore reduces friction losses, wear, and noise during operation of the single-stage gear reduction output mechanism 100. Although the first, second, and third roller sleeves 125, 133, 134 may be made of a variety of different materials, in one non-limiting example, the first, second, and third roller sleeves 125, 133, 134 are made from a self-lubricated plastic material or from a plastic material resistant to high temperature such as PEEK. As an alternative, the first, third, and fourth slot cutouts 124, 131, 132 in the locking plate 118 may be covered by self-lubricated plastic sleeves (not shown) while the support pin 126 and the first and second pins 119, 120 on the second gear 114 slide along the self-lubricated plastic sleeves with or without the use of the first, second, and third roller sleeves 125, 133, 134.

Regardless of whether the first, second, and third roller sleeves 125, 133, 134 or some other alternative are utilized, it should be appreciated that the geometry of the support pin 126 and the first and second pins 119, 120 on the second gear 114 significantly reduces friction losses. The cylindrical shape of the support pin 126 and the first and second pins 119, 120 on the second gear 114 minimizes the contact area between the support pin 126 and the first slot cutout 124 and between the first and second pins 119, 120 on the second gear 114 and the third and fourth slot cutouts 131, 132 in the locking plate 118 to either line or point contacts. As a result, the mechanical efficiency of the single-stage gear reduction output mechanism 100 illustrated in FIGS. 2-4 has been determined to be approximately 7-15 percent higher than traditional single-stage gear reduction output mechanisms with anti-back drive capability.

The gear housing 101 generally includes an auxiliary cavity 135 and a central cavity 136. The eccentric 102, axle shaft 104, and first and second gears 111, 114 are disposed within the central cavity 136 of the gear housing 101. The auxiliary cavity 135 of the gear housing 101 is open to and communicates with the central cavity 136. The locking plate 118 reciprocates along the lateral axis 123 in a translational motion within the auxiliary cavity 135 and the central cavity 136 of the gear housing 101. The interfaces between the locking plate 118, the first and second pins 119, 120 on the second gear 114, the support pin 126, and the second bearing surface 117 of the eccentric 102 synchronize the reciprocating motion of the locking plate 118 with the planetary, wobbling motion of the second gear 114. The planetary, wobbling motion of the second gear 114 relative to and within the central cavity 136 of the gear housing 101 follows a circular path where the second gear 114 does not rotate about its own centerline axis 121. During the planetary, wobbling motion of the second gear 114, the external teeth 115 of the second gear 114 mesh with the internal teeth 122 of the first gear 111, forcing the first gear 111, the axle shaft 104, and the output pinion 105 to rotate with an uniform rotational speed about the axis of rotation 107 in the same direction of rotation as the direction of rotation of the eccentric 102.

It should be appreciated that the single-stage gear reduction output mechanism 100 has only one, single-stage of gear reduction, which is the gear reduction between the first gear 111 and the second gear 114. The single-stage gear reduction output mechanism 100 operates as a transmission that transfers rotation from a driven element, namely the eccentric 102, to an output element, namely the output pinion 105. The single-stage gear reduction output mechanism 100 has a gear ratio (a reduction ratio) that is dictated by the difference between the number of internal teeth 122 on the first gear 111 and the number of external teeth 115 on the second gear 114. The gear ratio of the single-stage gear reduction output mechanism 100 is defined by Equation 1 below:

$$\text{Gear Ratio} = +\frac{N_2}{N_2 - N_1} \quad \text{(Equation 1)}$$

In accordance with Equation 1, $N_1$ is the number of external teeth 115 on the second gear 114 and $N_2$ is the number of internal teeth 122 on the first gear 111. The gear ratio of the single-stage gear reduction output mechanism 100 is a positive number, indicating that the direction of rotation at the output pinion 105 is the same as the direction of rotation that the eccentric 102 is being driven in by the actuator 24.

In order to maintain the eccentric 102 on the axle shaft 104 in a position where the first bearing surface 113 of the eccentric 102 is longitudinally aligned with the second bore 116 of the second gear 114, a bushing 137 is provided on the axle shaft 104. The bushing 137 is positioned on the axle shaft 104 longitudinally between the eccentric 102 and a spring washer 138 that contacts the gear housing 101. Although the bushing 137 and the spring washer 138 may be made of a variety of different materials, in one non-limiting example, the bushing 137 may be made of plastic and the spring washer 138 may be made of a metal such as steel. On the opposite side of the eccentric 102, a washer cup 139 contacts the eccentric 102 and holds the eccentric 102 in position. The washer cup 139 may be made of a metal and is supported by a rubber ring 140. Both the washer cup 139 and the rubber ring 140 are disposed on the axle shaft 104 longitudinally between the eccentric 102 and the splines 150 of the output pinion 105. The spring washer 138, washer cup 139, and rubber ring 140 are resilient and together apply a centering force on the eccentric 102 that biases the eccentric 102 into longitudinal alignment with the second gear 114.

With reference to FIG. 3, any attempt of the first gear 111 to drive the second gear 114 in a counter-clockwise direction, due to an external torque load T1 acting on the output pinion 105 by the sector gear 60, resulting for example from a collision, is prevented through a reaction moment M1 created by a first contact force F1 acting between the first slot cutout 124 of the locking plate 118 and the support pin 126, a second contact force F2 acting between the second slot cutout 130 and the second bearing surface 117 of the eccentric 102, and third and fourth contact forces F3, F4 acting between the third and fourth slot cutouts 131, 132 of the locking plate 118 and the first and second pins 119, 120 of the second gear 114. The first and second contact forces F1, F2 operate in opposing directions to prevent rotation of the eccentric 102. At the same time, the third and fourth contact forces F3, F4 operate in opposing directions to prevent rotation of the second gear 114, which creates the reaction moment M1 that opposes the external torque load T1 applied to the second gear 114 by the first gear 111. Because the support pin 126 and the second bearing surface 117 of the eccentric 102 limit the movement of the locking plate 118 to reciprocation along the lateral axis 123, the first gear 111 cannot back drive the second gear 114, and accordingly the eccentric 102, in a counter-clockwise direction.

The second gear 114 is driven on an eccentric path relative to the axis of rotation 107 through the engagement of the external teeth 115 of the second gear 114 with the internal teeth 122 of the first gear 111. The first and second pins 119, 120 on the second gear 114 can only slide with a minimal play along the third and fourth slot cutouts 131, 132 of the locking plate 118, in a direction that is transverse to the lateral axis 123. Accordingly, the locking plate 118 of the single-stage gear reduction output mechanism 100 prevents backwards rotation (i.e. counter-clockwise rotation) of the rotatable shaft 38 of the actuator 24, thereby protecting the actuator 24 from damage, as well as the backwards rotation (i.e. counter-clockwise rotation) of the output pinion 105, thereby preventing the loss of the current height or tilt position of the vehicle seat 69.

All the above formulated considerations are also valid for the case in which the eccentric 102 is driven in a counter-clockwise direction. In this case, the second gear 114 moves in a planetary, wobbling motion on an eccentric path in a counter-clockwise direction and the first gear 111, the axle shaft 104, and the output pinion 105 rotate in the same counter-clockwise direction. The first gear 111 cannot back drive in the clockwise direction due to a reaction moment and contact forces acting in opposite directions to those shown in FIG. 3.

Figure 5:
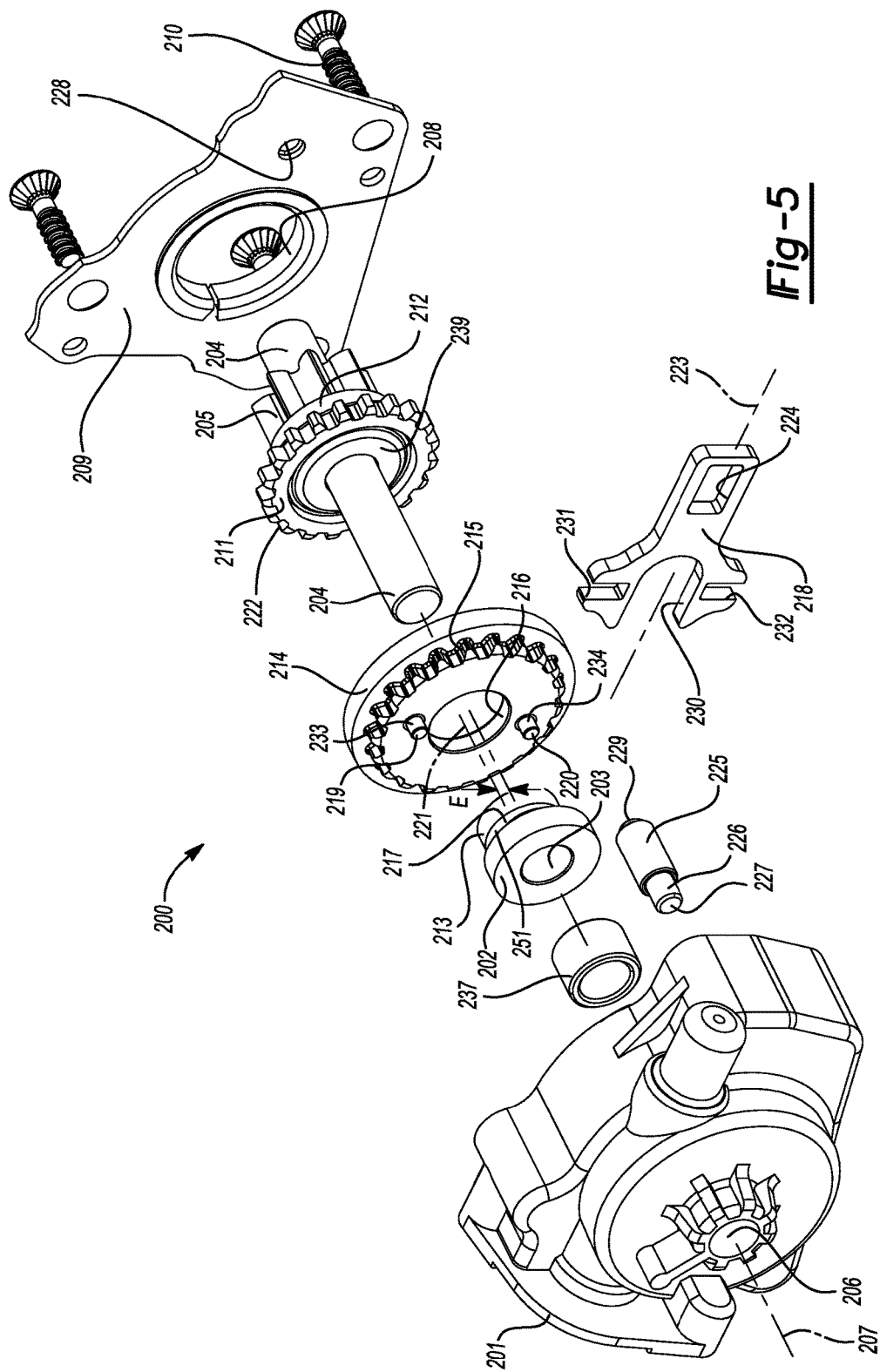
FIG. 5 is a front perspective exploded view of another exemplary single-stage gear reduction output mechanism constructed in accordance with the present disclosure that includes a locking plate retained by first and second pins projecting from a planetary gear with internal teeth and a support pin extending from a gear housing of the single-stage gear reduction output mechanism.

With reference to FIGS. 5-7, another single-stage gear reduction output mechanism 200 with anti-back drive capability and improved mechanical efficiency is illustrated. The single-stage gear reduction output mechanism 200 shown in FIGS. 5-7 is the same as the single-stage gear reduction output mechanism 100 shown in FIGS. 2-4 except that the planetary arrangement of the first and second gears 111, 114 in FIGS. 2-4 has been reversed in FIGS. 5-7. In FIGS. 2-4, the first gear 111 is provided with internal teeth 122 and the second gear 114 is provided with external teeth 115 that mesh with the internal teeth 122 of the first gear 111 and drive the second gear 114 in a planetary, wobbling motion within the first gear 111 (i.e. around the inside of the first gear 111). The opposite is true in FIGS. 5-7, where a first gear 211 is provided with external teeth 222 and a second gear 214 is provided with internal teeth 215 that mesh with the external teeth 222 of the first gear 211 to drive the second gear 214 in a planetary, wobbling motion around the first gear 211 (i.e. around the outside of the first gear 211). Apart from those changes, the structure and function of the components of the single-stage gear reduction output mechanism 200 shown in FIGS. 5-7 is substantially the same as the structure and function of the components described above in connection with the single-stage gear reduction output mechanism 100 shown in FIGS. 2-4. As such, the single-stage gear reduction output mechanism 200 shown in FIGS. 5-7 can be used in place of the single-stage gear reduction output mechanism 10 shown in FIG. 1.

The single-stage gear reduction output mechanism 200 shown in FIGS. 5-7 includes a gear housing 201 and an eccentric 202. The eccentric 202 is driven by the actuator 24 shown in FIG. 1, which is connected to the gear housing 201. As such, the eccentric 202 operates as the driven element of the single-stage gear reduction output mechanism 200. The eccentric 202 has a first bore 203. The single-stage gear reduction output mechanism 200 includes an axle shaft 204 and output pinion 205 that are arranged sequentially along an axis of rotation 207. The axle shaft 204 contacts and extends through the first bore 203 of the eccentric 202 such that the eccentric 202 is supported on and can rotate about the axle shaft 204. The axle shaft 204 is rotatably supported by a central bearing 206 disposed within the gear housing 201 at one end and a bearing sleeve 208 installed a gear housing bracket 209 single-stage gear reduction output mechanism 200 at the other end. The gear housing bracket 209 is fastened to the gear housing 201 by fasteners 210. The first gear 211 is mounted on and is rotatably fixed with the axle shaft 204. The first gear 211 includes an external bearing surface 212 in addition to the external teeth 222.

The eccentric 202 has a first bearing surface 213 that is cylindrical in shape. The first bearing surface 213 is eccentric relative to the axle shaft 204 and has an eccentricity E. The second gear 214 includes a second bore 216 in addition to the internal teeth 215. The first bearing surface 213 of the eccentric 202 contacts and extends through second bore 216 of the second gear 214 such that the second gear 214 can freely rotate on the first bearing surface 213 of the eccentric 202. The eccentric 202 also has a second bearing surface 217 that is cylindrical in shape and that is co-axially arranged with the axis of rotation 207 of the axle shaft 204. The first bearing surface 213 has a first radius R1 and the second bearing surface 217 has a second radius R2 that is smaller than the first radius R1 of the first bearing surface 213. Accordingly, a slot 251 is formed in the eccentric 202 between the first and second bearing surfaces 213, 217. A locking plate 218 is slidingly supported and guided by the slot 251 in the eccentric 202.

The second gear 214 includes first and second pins 219, 220 that extend longitudinally from the second gear 214. The second gear 214 has a centerline axis 221 that extends longitudinally through the second bore 216. The centerline axis 221 of the second gear 214 is parallel to the axis of rotation 207 of the axle shaft 204 and is spaced from the axis of rotation 207 by eccentricity E. The first and second pins 219, 220 are positioned symmetrically about the centerline axis 221 of the second gear 214. The internal teeth 215 of the second gear 214 mesh with the external teeth 222 of the first gear 211. When the actuator 24 shown in FIG. 1 drives rotation of the eccentric 202, the second gear 214 executes a planetary, wobbling motion about the first gears 211. While not shown, it should be appreciated that the second pin 220 may optionally be eliminated from the second gear 214 without a significant change to the operation of the single-stage gear reduction output mechanism 200.

The locking plate 218 extends along a lateral axis 223. The locking plate 218 includes first and second slot cutouts 224, 230 that are positioned along the lateral axis 223 and third and fourth slot cutouts 231, 232 that are positioned on opposite sides of the lateral axis 223. A support pin 226 extends between a first support pin end 227 that is rigidly fixed to the gear housing 201 and a second support pin end 229 that is rigidly fixed within a hole 228 in the gear housing bracket 209. The support pin 226 is received in and extends through the first slot cutout 224 and the second slot cutout 230 bears against the second bearing surface 217 of the eccentric 202, limiting the locking plate 218 to an axially constrained reciprocating motion along the lateral axis 223. The first and second pins 219, 220 on the second gear 214 are received in and extend through the third and fourth slot cutouts 231, 232 such that the locking plate 218 prevents the second gear 214 from rotating about its centerline axis 221. The support pin 226 and/or the first and second pins 219, 220 on the second gear 214 may optionally be provided with roller sleeves 225, 233, 234 to minimize friction, wear, and noise.

Regardless of whether the first, second, and third roller sleeves 225, 233, 234 or some other alternative are utilized, it should be appreciated that the geometry of the support pin 226 and the first and second pins 219, 220 on the second gear 214 significantly reduces friction losses. The support pin 226 and the first and second pins 219, 220 on the second gear 214 all have a cylindrical shape, which minimizes the contact area between the support pin 226 and the first slot cutout 224 and between the first and second pins 219, 220 on the second gear 214 and the third and fourth slot cutouts 231, 232 in the locking plate 218 to either line or point contacts. As a result, the mechanical efficiency of the single-stage gear reduction output mechanism 200 illustrated in FIGS. 5-7 has been determined to be approximately 7-15 percent higher than traditional single-stage gear reduction output mechanisms with anti-back drive capability.

The locking plate 218 reciprocates within an auxiliary cavity 235 and a central cavity 236 of the gear housing 201. The auxiliary cavity 235 is open to and communicates with the central cavity 236. The reciprocating, translational motion of the locking plate 218 is synchronized with the planetary, wobbling motion of second gear 214. The planetary, wobbling motion of the second gear 214, relative to the gear housing 201, follows in a circular path about the axis of rotation 207 of the axle shaft 204. During the planetary, wobbling motion of the second gear 214, the internal teeth 215 of the second gear 214 mesh with the external teeth 222 of the first gear 211, which forces the first gear 211, the axle shaft 204, and the output pinion 205 to rotate with uniform rotational speed about the axis of rotation 207 of the axle shaft 204 in the opposite direction of rotation compared to the direction of rotation in which the actuator 24 shown in FIG. 1 drives the eccentric 202.

It should be appreciated that the single-stage gear reduction output mechanism 200 has only one, single-stage of gear reduction, which is the gear reduction between the first gear 211 and the second gear 214. The single-stage gear reduction output mechanism 200 operates as a transmission that transfers rotation from a driven element, namely the eccentric 202, to an output element, namely the output pinion 205. The single-stage gear reduction output mechanism 200 has a gear ratio (a reduction ratio) that is dictated by the difference between the number of internal teeth 215 on the second gear 214 and the number of external teeth 222 on the first gear 211. The gear ratio of the single-stage gear reduction output mechanism 200 is defined by Equation 2 below:

$$\text{Gear Ratio} = -\frac{N_1}{N_2 - N_1} \quad \text{(Equation 2)}$$

In accordance with Equation 2, $N_1$ is the number of external teeth 222 on the first gear 211 and $N_2$ is the number of internal teeth 215 on the second gear 214. The gear ratio of the single-stage gear reduction output mechanism 200 is a negative number, indicating that the direction of rotation at the output pinion 205 is opposite from the direction of rotation that the eccentric 202 is being driven in by the actuator 24. Aside from changing the direction of rotation of the output pinion 205 relative to the eccentric 202, it should be appreciated that gear ratio provided by the single-stage gear reduction output mechanism 200 shown in FIGS. 5-7 will be numerically lower than the single-stage gear reduction output mechanism 100 shown in FIGS. 2-4 for any given gear diameter.

In order to maintain the eccentric 202 on the axle shaft 204 in a position where the first bearing surface 213 of the eccentric 202 is longitudinally aligned with the second bore 216 of the second gear 214, a bushing 237 is provided on the axle shaft 204. The bushing 237 is positioned on the axle shaft 204 longitudinally between the eccentric 202 and a spring washer 238 that contacts the gear housing 201. On the opposite side of the eccentric 202, a washer cup 239 supported by a rubber ring 240 contacts the eccentric 202 and holds the eccentric 202 in position. Both the washer cup 239 and the rubber ring 240 are disposed on the axle shaft 204 longitudinally between the eccentric 202 and splines 250 on the output pinion 205. The spring washer 238, washer cup 239, and rubber ring 240 are resilient and together apply a centering force on the eccentric 202 that biases the eccentric 202 into longitudinal alignment with the second gear 214.

With reference to FIG. 6, any attempt of the first gear 211 to drive the second gear 214 in a counter-clockwise direction, due to an external torque load T1 acting on the output pinion 205 by the sector gear 60, resulting for example from a collision, is prevented through a reaction moment M1 created by a first contact force F1 acting between the first slot cutout 224 of the locking plate 218 and the support pin 226, a second contact force F2 acting between the second slot cutout 230 and the second bearing surface 217 of the eccentric 202, and third and fourth contact forces F3, F4 acting between the third and fourth slot cutouts 231, 232 of the locking plate 218 and the first and second pins 219, 220 of the second gear 214. The first and second contact forces F1, F2 operate in opposing directions to prevent rotation of the eccentric 202. At the same time, the third and fourth contact forces F3, F4 operate in opposing directions to prevent rotation of the second gear 214, which creates the reaction moment M1 that opposes the external torque load T1 applied to the second gear 114 by the first gear 211. Because the support pin 226 and the second bearing surface 217 of the eccentric 202 limit the movement of the locking plate 218 to reciprocation along the lateral axis 223, the first gear 211 cannot back drive the second gear 214, and accordingly the eccentric 202, in a clockwise direction.

The second gear 214 is driven on an eccentric path relative to the axis of rotation 207 through the engagement of the internal teeth 215 of the second gear 214 with the external teeth 222 of the first gear 211. The first and second pins 219, 220 on the second gear 214 can only slide with a minimal play along the third and fourth slot cutouts 231, 232 of the locking plate 218, in a direction that is transverse to the lateral axis 223. Accordingly, the locking plate 218 of the single-stage gear reduction output mechanism 200 prevents the clockwise rotation of the rotatable shaft 38 of the actuator 24, thereby protecting the actuator 24 from damage, as well as the counter-clockwise rotation of the output pinion 205, thereby preventing the loss of the current height or tilt position of the vehicle seat 69.

All the above formulated considerations are also valid for the case in which the eccentric 202 is driven in a clockwise direction. In this case, the second gear 214 moves in a planetary, wobbling motion on an eccentric path in a clockwise direction, while the first gear 211, the axle shaft 204, and the output pinion 205 rotate in the counter-clockwise direction. The first gear 211 cannot back drive in the clockwise direction due to a reaction moment and contact forces acting in opposite directions to those shown in FIG. 6.

Many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A single-stage gear reduction output mechanism for an automotive seat adjuster drive, said single-stage gear reduction output mechanism comprising:
   a gear housing bracket;
   a gear housing extending from said gear housing bracket to define a cavity therein;
   an axle shaft disposed within said cavity of said gear housing and extending along an axis of rotation;
   said axle shaft being supported within said cavity of said gear housing such that said axle shaft is free to rotate about said axis of rotation;
   an eccentric carried on said axle shaft and including a first bore that is concentric with said axle shaft, a first bearing surface that is eccentric relative to said axle shaft, and a second bearing surface that is concentric with said axle shaft;
   said axle shaft extending through said first bore in said eccentric with a slip fit such that said eccentric is free to rotate relative to said axle shaft;
   a first gear carried on said axle shaft that is rotatably coupled with said axle shaft such that said first gear rotates with said axle shaft about said axis of rotation;
   a second gear carried on said first bearing surface of said eccentric and disposed in meshing engagement with said first gear;
   said second gear including a second bore and a centerline axis that extends co-axially through said second bore;
   said first bearing surface of said eccentric extending through said second bore in said second gear with a slip fit such that said eccentric is free to rotate relative to said second gear;
   said first gear and said second gear having a planetary arrangement where said centerline axis of said second gear is parallel to and spaced from said axis of rotation of said axle shaft;
   a locking plate disposed within said cavity of said gear housing and including a first slot cutout, a second slot cutout, and a third slot cutout;
   a support pin rigidly fixed in place relative to said axle shaft that is parallel to and spaced from said axis of rotation of said axle shaft and that extends through said first slot cutout in said locking plate;
   said second bearing surface of said eccentric extending through said second slot cutout in said locking plate where said second bearing surface of said eccentric and said support pin cooperate to support said locking plate within said cavity of said gear housing and limit movement of said locking plate relative to said gear housing to movement along a lateral axis that is transverse to said axis of rotation of said axle shaft; and
   said second gear including a first pin that is spaced from and parallel to said centerline axis of said second gear where said first pin extends through said third slot cutout in said locking plate and prevents said first gear from driving rotation of said second gear.

2. The single-stage gear reduction output mechanism of claim 1, wherein said locking plate is longitudinally offset relative to said first and second gears.

3. The single-stage gear reduction output mechanism of claim 2, wherein said first and second bearing surfaces of said eccentric are cylindrical and are arranged next to one another on said eccentric relative to and along said axis of rotation, said first bearing surface having a first radius, and said second bearing surface having a second radius that is smaller than said first radius to form a slot in said eccentric that is longitudinally aligned with said second bearing surface.

4. The single-stage gear reduction output mechanism of claim 3, wherein at least part of said locking plate is slidingly received in said slot in said eccentric.

5. The single-stage gear reduction output mechanism of claim 1, wherein said locking plate includes a fourth slot cutout and said second gear includes a second pin that is spaced from and parallel to said centerline axis of said second gear and said first pin where said second pin extends through said fourth slot cutout in said locking plate and cooperates with said first pin to prevent said first gear from driving rotation of said second gear.

6. The single-stage gear reduction output mechanism of claim 5, wherein said first and second slot cutouts in said locking plate are spaced apart and extend along said lateral axis of said locking plate and wherein said third and fourth slot cutouts are disposed on opposite sides of said lateral axis and are transverse to said lateral axis.

7. The single-stage gear reduction output mechanism of claim 5, wherein said first slot cutout of said locking plate has a rectangular shape that is closed on four sides and said second, third, and fourth slot cutouts of said locking plate each has a U-like shape that is open on one side.

8. The single-stage gear reduction output mechanism of claim 1, wherein said first gear includes a number of internal teeth and said second gear includes a number of external teeth that are meshingly engaged with said internal teeth of said first gear and wherein said first pin of said second gear and said locking plate constrain said second gear to a planetary, wobbling movement around said axis of rotation of said shaft and within said internal teeth of said first gear when said eccentric is rotatably driven.

9. The single-stage gear reduction output mechanism of claim 8, wherein said first and second gear have a gear ratio that is a positive number equaling said number of internal teeth of said first gear divided by the difference between said number of internal teeth of said first gear and said number of external teeth of said second gear.

10. The single-stage gear reduction output mechanism of claim 1, wherein said first gear includes a number of external teeth and said second gear includes a number of internal teeth that are meshingly engaged with said external teeth of said first gear and wherein said first pin of said second gear and said locking plate constrain said second gear to a planetary, wobbling movement around said axis of rotation of said shaft and about said external teeth of said first gear when said eccentric is rotatably driven.

11. The single-stage gear reduction output mechanism of claim 10, wherein said first and second gear have a gear ratio that is a negative number equaling said number of external teeth of said first gear divided by the difference between said number of internal teeth of said second gear and said number of external teeth of said first gear.

12. The single-stage gear reduction output mechanism of claim 1, wherein said support pin and said first pin are cylindrical in shape.

13. The single-stage gear reduction output mechanism of claim 12, wherein said support pin and said first pin each includes a roller sleeve that is free to rotate.

14. The single-stage gear reduction output mechanism of claim 1, wherein said support pin extends between a first support pin end that is supported by said gear housing and a second support pin end that is supported by said gear housing bracket.

15. The single-stage gear reduction output mechanism of claim 1, wherein said gear housing bracket includes a bearing sleeve, said first gear includes an external bearing surface that contacts and extends through said bearing sleeve, and said axle shaft is support by said housing at one end and said first gear and said bearing sleeve at another end.

16. An automotive seat adjuster drive comprising:
a gear housing bracket;
a gear housing extending from said gear housing bracket to define a cavity therein;
an axle shaft disposed within said cavity of said gear housing and extending along an axis of rotation;
said axle shaft being supported within said cavity of said gear housing such that said axle shaft is free to rotate about said axis of rotation;
an eccentric carried on said axle shaft and including a first bore that is concentric with said axle shaft, a first bearing surface that is eccentric relative to said axle shaft, and a second bearing surface that is concentric with said axle shaft;
an actuator rotatably coupled to eccentric for driving rotation of said eccentric about said axis of rotation of said axle shaft;
said axle shaft extending through said first bore in said eccentric with a slip fit such that said eccentric is free to rotate relative to said axle shaft;
a first gear carried on said axle shaft that is rotatably coupled to said axle shaft such that said first gear rotates with said axle shaft about said axis of rotation;
a second gear carried on said first bearing surface of said eccentric and disposed in meshing engagement with said first gear;
said second gear including a second bore and a centerline axis that extends co-axially through said second bore;
said first bearing surface of said eccentric extending through said second bore in said second gear with a slip fit such that said eccentric is free to rotate relative to said second gear;
said first gear and said second gear having a planetary arrangement where said centerline axis of said second gear is parallel to and spaced from said axis of rotation of said axle shaft;
a locking plate disposed within said cavity of said gear housing and including a first slot cutout, a second slot cutout, and a third slot cutout;
a support pin rigidly fixed in place relative to said axle shaft that is parallel to and spaced from said axis of rotation of said axle shaft and that extends through said first slot cutout in said locking plate;
said second bearing surface of said eccentric extending through said second slot cutout in said locking plate where said second bearing surface of said eccentric and said support pin cooperate to support said locking plate within said cavity of said gear housing and limit movement of said locking plate relative to said gear housing to movement along a lateral axis that is transverse to said axis of rotation of said axle shaft; and
said second gear including a first pin that is spaced from and parallel to said centerline axis of said second gear where said first pin extends through said third slot cutout in said locking plate and prevents said first gear from driving rotation of said second gear.

17. The automotive seat adjuster drive of claim 16, wherein said actuator includes a rotatable shaft and a worm that is disposed within said cavity of said gear housing, said worm being rotatably coupled with said rotatable shaft and disposed in meshing engagement with gear teeth provided on said eccentric.

18. The automotive seat adjuster drive of claim 16, wherein said actuator includes a rotatable shaft and a worm that is disposed within said cavity of said gear housing, said worm being rotatably coupled with said rotatable shaft and disposed in meshing engagement with an input gear that is rotatably coupled with said eccentric.

19. An automotive seat assembly comprising:
   a frame including two side plates and front and rear cross-members that extend across said frame between said side plates;
   a sector gear rotatably coupled with said rear cross-member that rotates with said rear cross-member;
   a gear housing bracket attached to one of said side plates of said frame;
   a gear housing extending from said gear housing bracket to define a cavity therein;
   an axle shaft disposed within said cavity of said gear housing and extending along an axis of rotation;
   said axle shaft being supported within said cavity of said gear housing such that said axle shaft is free to rotate about said axis of rotation;
   an output pinion rotatably coupled with said axle shaft that rotates with said axle shaft;
   said output pinion including pinion teeth that are meshingly engaged with said sector gear;
   an eccentric carried on said axle shaft and including a first bore that is concentric with said axle shaft, a first bearing surface that is eccentric relative to said axle shaft, and a second bearing surface that is concentric with said axle shaft;
   an actuator mounted to said gear housing and rotatably coupled to eccentric for driving rotation of said eccentric about said axis of rotation of said axle shaft;
   said axle shaft extending through said first bore in said eccentric with a slip fit such that said eccentric is free to rotate relative to said axle shaft;
   a first gear carried on said axle shaft that is rotatably coupled to said axle shaft such that said first gear rotates with said axle shaft about said axis of rotation;
   a second gear carried on said first bearing surface of said eccentric and disposed in meshing engagement with said first gear;
   said second gear including a second bore and a centerline axis that extends co-axially through said second bore;
   said first bearing surface of said eccentric extending through said second bore in said second gear with a slip fit such that said eccentric is free to rotate relative to said second gear;
   said first gear and said second gear having a planetary arrangement where said centerline axis of said second gear is parallel to and spaced from said axis of rotation of said axle shaft;
   a locking plate disposed within said cavity of said gear housing and including a first slot cutout, a second slot cutout, and a third slot cutout;
   a support pin rigidly fixed in place relative to said axle shaft that is parallel to and spaced from said axis of rotation of said axle shaft and that extends through said first slot cutout in said locking plate;
   said second bearing surface of said eccentric extending through said second slot cutout in said locking plate where said second bearing surface of said eccentric and said support pin cooperate to support said locking plate within said cavity of said gear housing and limit movement of said locking plate relative to said gear housing to movement along a lateral axis that is transverse to said axis of rotation of said axle shaft; and
   said second gear including a first pin that is spaced from and parallel to said centerline axis of said second gear where said first pin extends through said third slot cutout in said locking plate and prevents said first gear from driving rotation of said second gear.

20. The automotive seat assembly of claim 19, further comprising a vehicle seat mounted on and supported by said frame.

* * * * *